US005601913A

United States Patent [19]

Ohtani et al.

[11] Patent Number: 5,601,913

[45] Date of Patent: Feb. 11, 1997

[54] TRANSFER MATERIAL CARRYING MEMBER AND IMAGE FORMING APPARATUS

[75] Inventors: Noriko Ohtani; Naoto Fujimura, both of Yokohama; Kiyoshi Sakai, Hachioji; Teigo Sakakibara, Yokohama; Yuichi Hashimoto, Tokyo, all of Japan

[73] Assignee: Canon Kabushiki Kaisha, Tokyo, Japan

[21] Appl. No.: 190,564

[22] Filed: Feb. 2, 1994

Related U.S. Application Data

[63] Continuation of Ser. No. 9,732, Jan. 27, 1993, abandoned.

[30] Foreign Application Priority Data

Jan. 30, 1992 [JP] Japan .................................... 4-038459

[51] Int. Cl.$^6$ .............................. B32B 5/16; G03G 15/16

[52] U.S. Cl. .......................... 428/323; 428/328; 428/412; 428/220; 428/338; 428/339; 428/35.7; 428/36.9; 252/518; 524/401; 524/430; 361/214; 361/220

[58] Field of Search .................................... 428/323, 328, 428/412, 220, 339, 409, 35.7, 36.9, 338; 355/274, 275; 361/214, 220, 221; 430/126; 524/430, 401; 252/518

[56] References Cited

U.S. PATENT DOCUMENTS

| | | | |
|---|---|---|---|
| 4,466,912 | 8/1984 | Phillips et al. | 252/512 |
| 4,747,992 | 5/1988 | Sypula et al. | 264/130 |
| 5,034,777 | 7/1991 | Ohzeki et al. | 355/274 |
| 5,091,751 | 2/1992 | Inoue et al. | 355/274 |
| 5,126,763 | 6/1992 | Atherton et al. | 346/135.1 |
| 5,172,173 | 12/1992 | Goto et al. | 355/275 |
| 5,204,177 | 4/1993 | Sato et al. | 428/328 |
| 5,206,072 | 4/1993 | Haga | 428/195 |
| 5,270,142 | 12/1993 | Snelling | 430/78 |

FOREIGN PATENT DOCUMENTS 60-10625 1/1985 Japan .

*Primary Examiner*—Patrick Ryan
*Assistant Examiner*—Marie R. Yamnitzky
*Attorney, Agent, or Firm*—Fitzpatrick, Cella, Harper & Scinto

[57] ABSTRACT

There is provided a transfer material carrying member and an image forming apparatus using it. The transfer material carrying member comprises a metal oxide and a polycarbonate resin having a repeating unit represented by the following formula:

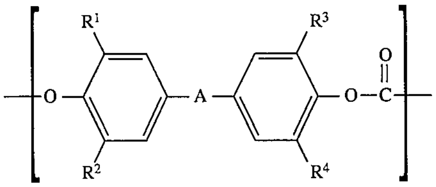

The transfer medium carrying member of the present invention has superior surface electrical characteristics, mechanical strength and transparency. The image forming apparatus making use of the transfer medium carrying member enables consistently good transfer even when copies are repeatedly taken and makes it possible to obtain consistently stable, good images.

30 Claims, 4 Drawing Sheets

TRANSFER MATERIAL CARRYING MEMBER AND IMAGE FORMING APPARATUS

This application is a continuation of application Ser. No. 08/009,732 filed Jan. 27, 1993, now abandoned.

BACKGROUND OF THE INVENTION

1. Field of the invention

The present invention relates to a transfer material carrying member and an image forming apparatus. More particularly, it is concerned with a transfer material carrying member used when a toner image formed by electrophotography or electrostatic recording is transferred to a transfer material, and an image forming apparatus having such a transfer material carrying member. The image forming apparatus herein includes black and white, monochromatic or full-color electrophotographic copying machines, printers and other various recording apparatus.

1. Related Background Art

Various members are known as transfer material carrying members used when an image on an image bearing member is transferred to a transfer material. For example, in an electrophotographic apparatus having image forming means carrying out the steps of charging, imagewise exposure, toner development, transfer and cleaning, a means for transferring an image on a photosensitive member to a transfer material as exemplified by paper may include a transfer drum and a transfer device as shown in FIGS. 1 and 2, respectively.

A transfer drum 10 comprises a support comprised of cylinders 12 and 13 provided on its both ends and a connecting part 14 that connects these cylinders. A transfer material carrying member 11 is so provided on this support as to extend through an opening formed on its peripheral wall. The connecting part 14 is provided with a transfer material gripper 15 that holds a transfer material fed from a paper feeder. A transfer discharge assembly 21, and an internal charge-eliminating discharge assembly 23 and external charge-eliminating discharge assemblies 22 and 24 that constitute a charge-eliminating means are also provided inside and outside the transfer drum 10.

In the transfer step, various mechanical and electrical external forces are applied to the transfer material carrying member 11 during transport of transfer materials, transfer charging, charge elimination, cleaning and so forth, and hence the transfer material carrying member is required to be durable to such external forces, that is, to have mechanical strength, wear resistance and electrical durability as well as an excellent surface lubricity to a cleaning member or the like.

Films of resins such as Teflon, polyester, polyvinylidene fluoride, triacetate and polycarbonate have been hitherto used as transfer material carrying members. When, however, these resin films are used as transfer material carrying members, release discharge occurs when a transfer material is released from a photosensitive drum immediately after transfer, so that the transfer material is statically charged because of this release discharge. The charges thus produced can not escape anywhere and are held by the transfer material and the transfer material carrying member, often bringing about disorder of toner images on the transfer material or non-uniform charging for the subsequent transfer. On such occasions, it has been necessary to strictly set transfer conditions, e.g., to precisely control transfer current values or to eliminate residual charges on the transfer material carrying member by means of reverse charging or AC charging.

To solve such problems, Japanese Patent Application Laid-open No. 60-10625 discloses a method in which carbon black is dispersed in a resin film used as a transfer material carrying member, to arbitrarily control volume resistance of the resin film.

Such a carbon-dispersed film, however, tends to have a relatively low transparency, and hence use of this film as a transfer material carrying member in an image forming apparatus may give a limitation on the position at which an optical sensor is provided. Accordingly, it is sought to provide a transfer material carrying member having a higher light transmittance.

In recent years, it has become popular to use in a developer what is called small-diameter toner particles, having particle diameters of 10 μm or less and an average particle diameter of about 8 μm, in order to make a latent image highly minute so that images can have a higher image quality, and in order to improve reproduction of such a latent image. Hence, the toner particles tend to pick up a very slight uneven potential produced on a transfer material carrying member in the transfer step. Thus, it is sought to provide a transfer material carrying member that has a reduced tendency to cause charge unevenness.

SUMMARY OF THE INVENTION

An object of the present invention is to provide a transfer material carrying member that has solved the above problems and can give always good images, and an image forming apparatus making use of such a transfer material carrying member.

The present invention provides a transfer material carrying member comprising a metal oxide and a polycarbonate resin having a repeating unit represented by the following Formula (1):

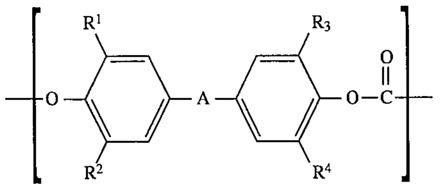

Formula (1)

wherein A represents a straight-chain, branched or cyclic alkylidene group, an aryl-substituted alkylidene group, an arylenedialkylidene group, —O—, —S—, —CO—, —SO— or —$SO_2$—; and $R^1$, $R^2$, $R^3$ and $R^4$ each represent a hydrogen atom, a halogen atom, an alkyl group having 1 to 4 carbon atoms, or an alkenyl group.

The present invention also provides an image forming apparatus having an image bearing member and the transfer material carrying member described above.

DETAILED DESCRIPTION OF THE INVENTION

Figure 1:
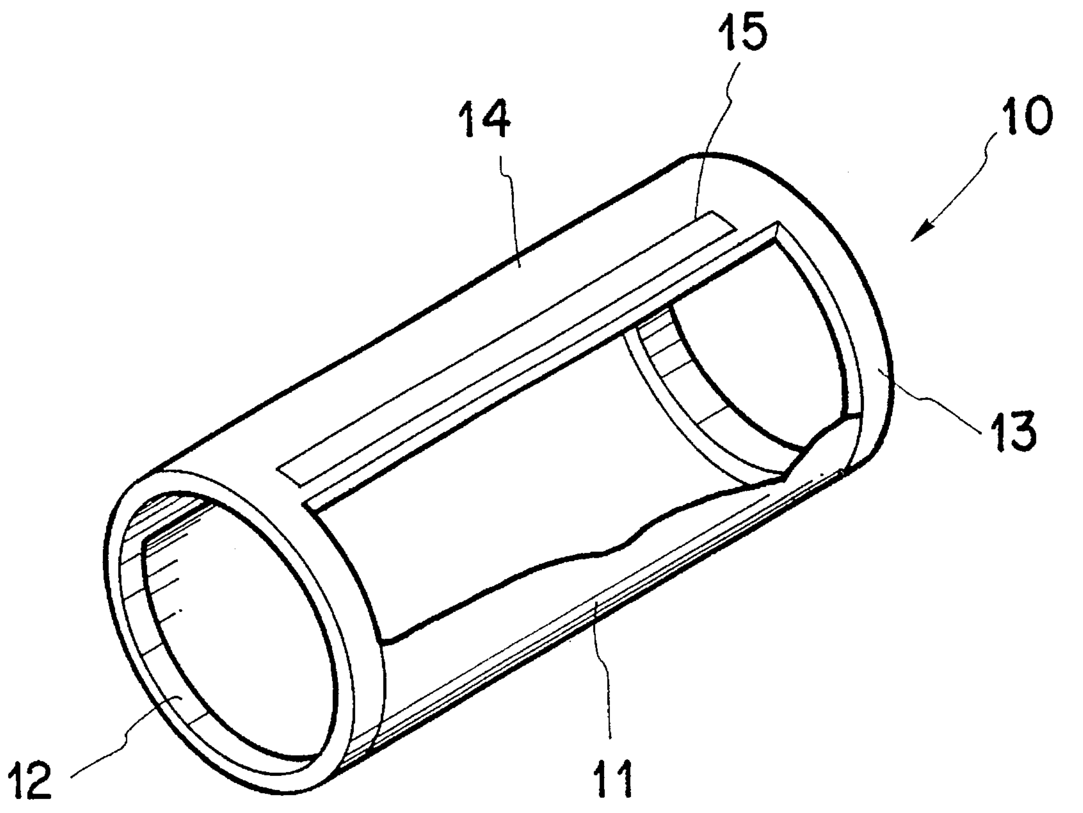
FIG. 1 is a schematic illustration of the construction of a transfer drum having the transfer material carrying member of the present invention.

The transfer material carrying member of the present invention comprises a polycarbonate resin having the repeating unit represented by the following Formula (1), and a metal oxide.

Formula (1)

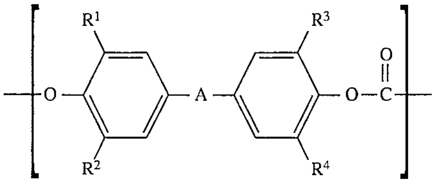

wherein A represents a straight-chain, branched or cyclic alkylidene group, an aryl-substituted alkylidene group, an arylenedialkylidene group, —O—, —S—, —CO—, —SO— or —$SO_2$—; and $R^1$, $R^2$, $R^3$ and $R^4$ each independently represent a hydrogen atom, a halogen atom, an alkyl group having 1 to 4 carbon atoms, or an alkenyl group.

The polycarbonate resin of the present invention, having the repeating unit represented by Formula (1) can be obtained by allowing a bisphenol compound represented by the following Formula (2)

(2)

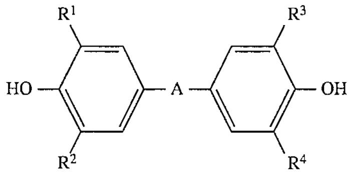

wherein $R^1$, $R^2$, $R^3$ and $R^4$ are as defined for those in Formula (1), to react with phosgene, carbonate or chloroformate. The polycarbonate resin may preferably have a viscosity average molecular weight of from 10,000 to 50,000, and particularly preferably from 20,000 to 40,000.

Preferred bisphenol compounds used as starting materials for the polycarbonate resin of the present invention may include bis(4-hydroxyphenyl) methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane, 2,2-bis(4-hydroxyphenyl)butane, 1,1-bis(4-hydroxyphenyl)cyclohexane, 2,2-bis(4-hydroxy-3,5-dimethyphenyl)propane, 2,2-bis(4-hydroxy-3,5-dibromophenyl)propane, 2,2-bis(4-hydroxy-3,5-dichlorophenyl) propane, 2,2-bis(4-hydroxy-3-bromophenyl)propane, 2,2-bis(4-hydroxy-3-chlorophenyl)propane, 1,1-bis(4-hydroxyphenyl)-1-phenylethane, bis(4-hydroxyphenyl)methane and 1,4-bis[2-(4-hydroxyphenyl)propyl]benzene. Of these, 2,2-bis(4-hydroxyphenyl)propane, 1,1-bis(4-hydroxyphenyl)-propane and 1,1-bis(4-hydroxyphenyl)cyclohexane are particularly preferred in view of thermal stability and so forth.

When such a polycarbonate resin of the present invention is synthesized, a chain terminator or a molecular weight modifier may be used. These may include compounds having a monovalent phenolic hydroxyl group, as exemplified by phenol, p-tertiary-butylphenol and tribromophenol, as well as long-chain alkylphenols, aliphatic carboxylic acid chlorides, aliphatic carboxylic acids, hydroxybenzoic acid alkyl esters, hydroxyphenyl alkyl acid esters and alkyl ether phenols. These may preferably be used in an amount of from 100 to 0.5 mol, and particularly preferably from 50 to 2 mols, based on 100 mols of all the bisphenol compounds used. In the present invention, two or more compounds of any of these may be used in combination. In the present invention, a branching agent may also be added in an amount of from 0.01 to 3 mol %, and particularly preferably from 0.1 to 1.0 mol %, in approximation based on the bisphenol compounds described above, to give a branched polycarbonate. The branching agent may include fluoroglycine, polyhydroxy compounds such as 2,6-dimethyl-2,4,6-tri(4-hydroxyphenyl)heptene-3, 4,6-dimethyl-2,4,6-tri(4-hydroxyphenyl)heptene-2, 1,3,5-tri(2-hydroxyphenyl)benzole, 1,1,1-tri(4-hydroxyphenyl)ethane, 2,6-bis(2-hydroxy-5-methylbenzyl)-4-methylphenol and α,α',α"-tri(4-hydroxyphenyl)-1,3,5-triisopropylbenzene, and 3,3-bis(4-hydroxyaryl)oxyindole (i.e., isatin bisphenol), 5-chloroisatin, 5,7-dichloroisatin, and 5-bromoisatin.

The metal oxide used in the present invention may preferably have a particle diameter of 1 μm or less, and particularly preferably 0.3 μm or less, as a number average particle diameter. As a powder, it may preferably have a volume resistivity of not higher than 100 Ω·cm, and particularly preferably not higher than 70 Ω·cm. The metal oxide may include powders as exemplified by titanium oxide, indium oxide, zinc oxide, tin oxide, antimony oxide, bismuth oxide, indium oxide doped with tin, tin oxide doped with antimony, and zirconium oxide. The metal oxide may be used alone or in the form of a mixture of two or more kinds. When used in the form of a mixture of two or more kinds, they not only may be merely simultaneously used but also may be used in the form of a solid solution or a fused solid. In the present invention, the metal oxide may preferably contained in an amount of from 1 to 300 parts by weight, and particularly preferably from 3 to 100 parts by weight, based on 100 parts by weight of the polycarbonate resin. The metal oxide can be compounded by any conventionally known methods. For example, polycarbonate powder and the metal oxide may be simply blended. They may also be melt-kneaded by either a batch system or a continuous system.

The metal oxide may be surface-treated using a treating agent such as an organic silicate, an organic titanate or an organopolysiloxane, and may be treated by either the dry process or the wet process. The wet-process treatment is usually carried out by immersing the metal oxide in a low-boiling solvent solution of the treating agent, followed by removal of the solvent. The dry-process treatment is usually carried out by mixing the metal oxide and the treatment agent in a mixing machine such as a Henschel mixer, a super mixer or a V-type blender, or spraying the metal oxide with an organic solution of the treating agent to make them adhere, further optionally followed by heat treatment at 100° to 250° C. after the adhesion. This treatment can be effective for moderating a lowering of molecular weight when the polycarbonate resin is melted.

Various additives conventionally usable in polycarbonate resins may also be added to the polycarbonate resin used in the present invention. Such additives may include reinforcing agents, antioxidants, fillers, stabilizers, ultraviolet absorbents, antistatic agents, lubricants, release agents, dyes, pigments and other flame-retardants or elastomers for improving impact resistance. For example, preferable stabilizers are phosphorous acid and phosphites. Preferable release agents are esters of mono- or polyhydric alcohols of saturated fatty acids as exemplified by stearyl stearate, behenyl behenate, pentaerythritol tetrastearate, and dipentaerythritol hexaoctoate.

The polycarbonate resin of the present invention may contain two or more kinds of the repeating unit represented by Formula (1).

The metal oxide-dispersed resin used in the present invention can be formed into a sheet by extrusion or injection molding. The resin sheet thus formed may preferably have a volume resistivity of from $1\times10^2$ Ω·cm to $1\times10^{17}$ Ω·cm, and a specific dielectric constant of not less than 2.5. It may be in the form of a sheet, or in the form of an endless belt comprised of a sheet whose ends are bonded by heat sealing, ultrasonic sealing, adhesive bonding or the like means. It may be made to have any desired most preferable form depending on the image forming apparatus to which it is applied. The thickness of the sheet may vary depending on the volume resistivity or specific dielectric constant, and may preferably be in the range of from 50 μm to 300 μm, and particularly from 70 μm to 200 μm.

Even when electrical and mechanical external forces are applied during transfer charging, charge elimination, paper feeding, cleaning and so forth, the transfer material carrying member of the present invention is durable to repeated use because of its durability to these external forces, i.e., its superior electrical durability, mechanical strength and wear resistance. In addition, because of its superior electrical characteristics, stability, uniform surface and freedom from blank areas transfer can be carried out.

As a result, consistently good transfer can be carried out during its repeated use, and consistently stable and good images can be obtained.

In the present invention, since the metal oxide is used, a polycarbonate resin sheet having a high light-transmittance can be formed as the transfer material carrying member. Hence, when this sheet is used as a transfer material carrying member in an image forming apparatus, not only the transfer material carrying member can be provided without limitations on the position at which an optical sensor is set up, but also a jam-detecting sensor can be positioned inside the transfer material carrying member, so that there is another advantage that the jam-detecting sensor does not tend to be contaminated with toner or paper dust.

The image forming apparatus of the present invention will be described below with reference to FIGS. 3 and 4 which illustrate examples of the image forming apparatus having the transfer material carrying member of the present invention.

Figure 3:
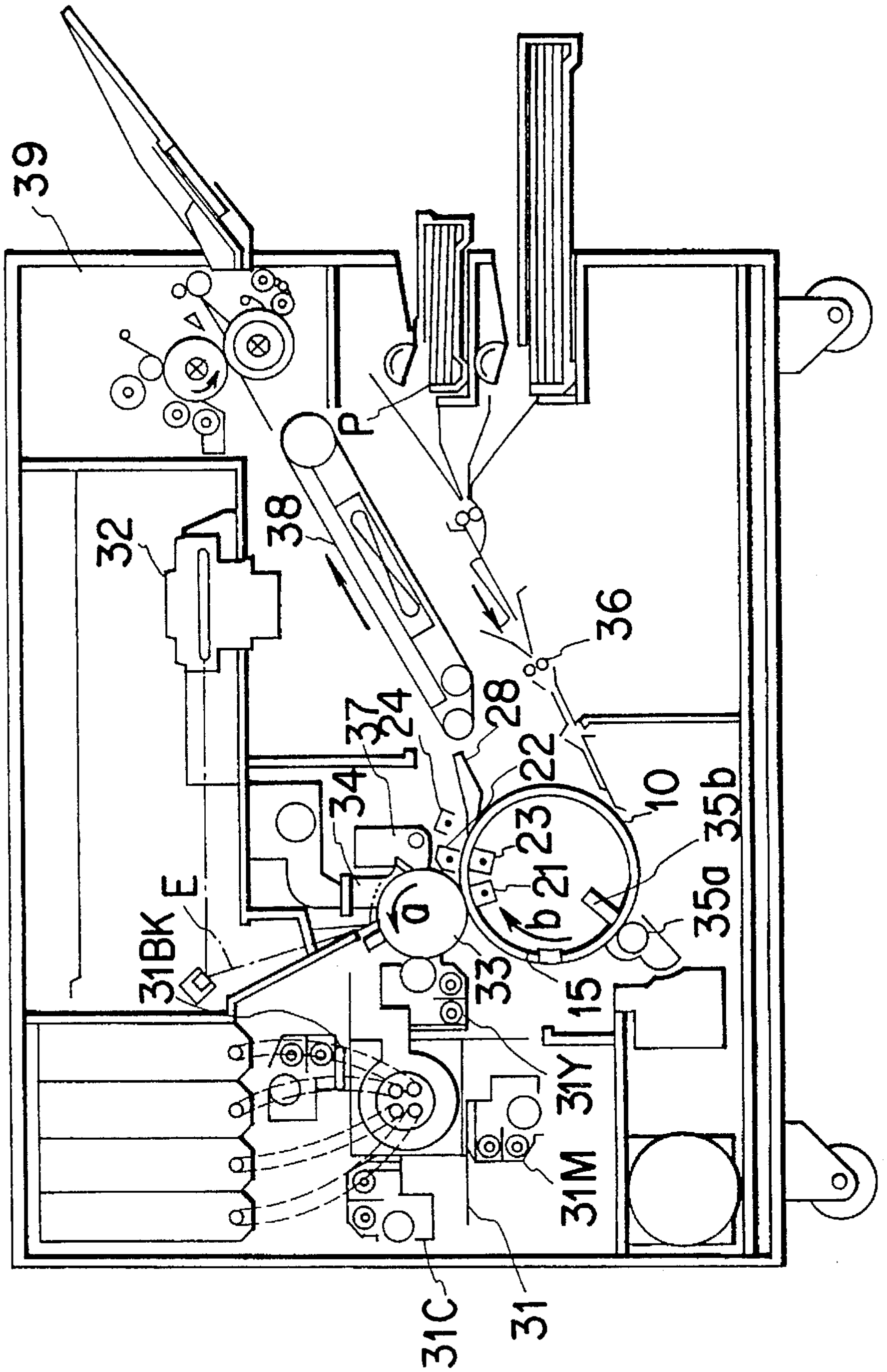
FIG. 3 is a schematic illustration of the construction of an image forming apparatus comprising a transfer drum having the transfer material carrying member of the present invention.
Figure 4:
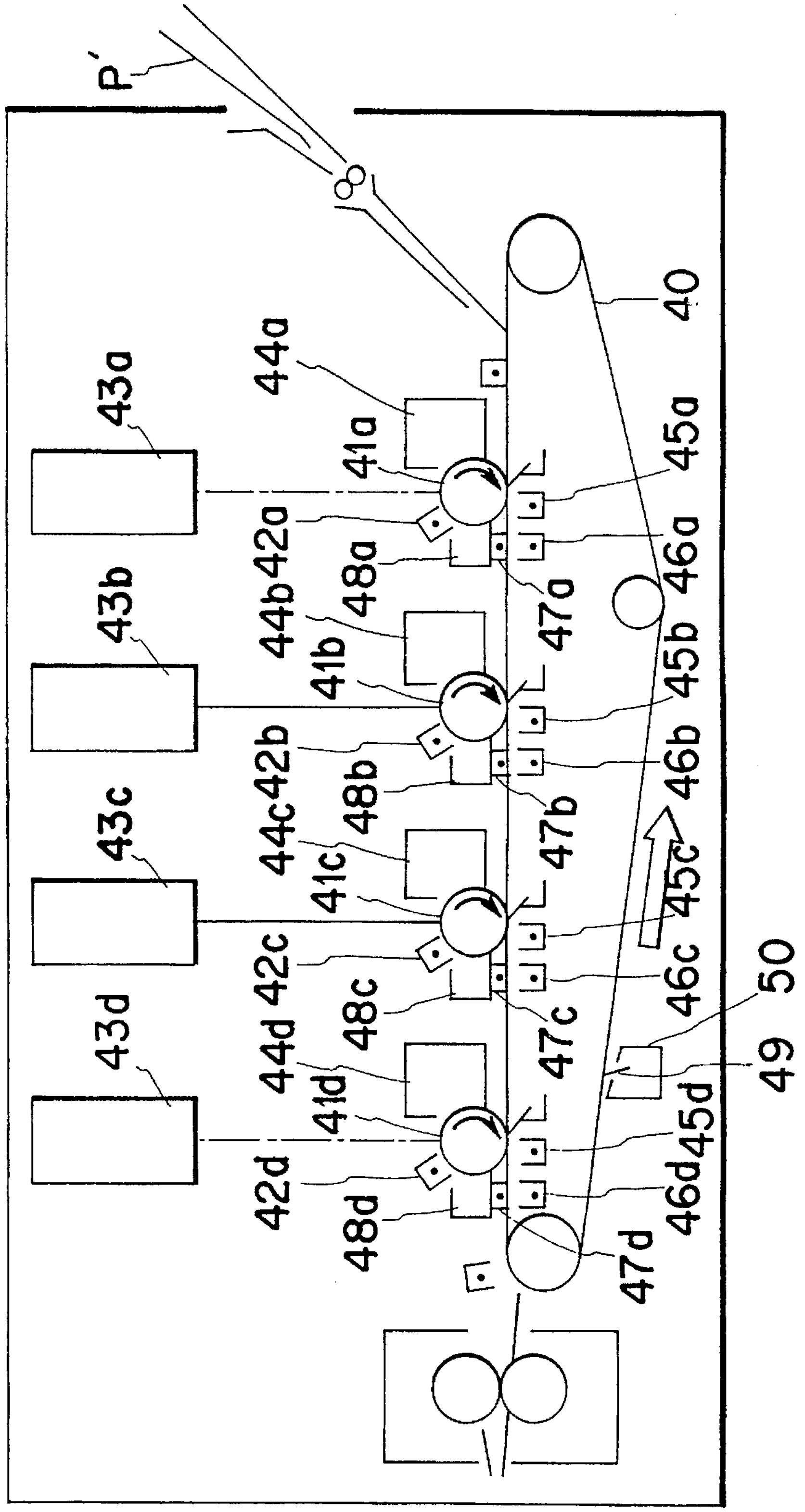
FIG. 4 is a schematic illustration of the construction of an image forming apparatus comprising an endless belt type transfer belt making use of the transfer material carrying member of the present invention.

Both the image forming apparatus shown in FIGS. 3 and 4 are examples of multi-color (full-color) image forming apparatus.

The image forming apparatus will be briefly described first with reference to FIG. 3. The multi-color electrophotographic copying machine shown in FIG. 3 is provided with an image bearing member, i.e., photosensitive drum 33, which is rotatably supported on an axis and is rotated in the direction of an arrow. An image forming means is provided on its circumferential zone. The image forming means may be of any means. In the present example, there are provided a primary charge assembly 34 that uniformly charges the photosensitive drum 33, an exposure means 32 comprised of, e.g., a laser beam exposure device that irradiates a color-separated light image or a light image corresponding thereto to form an electrostatic latent image on the photosensitive drum 33, and a rotary developing device 31 that converts to a visible image the electrostatic latent image formed on the photosensitive drum 33.

The rotary developing device 31 is comprised of four sets of developing assemblies 31Y, 31M, 31C and 31Bk that contain four colors of developers, a yellow color developer, a magenta color developer, a cyan color developer and a black color developer, respectively, and a substantially cylindrical housing that holds these four sets of developing assemblies 31Y, 31M, 31C and 31Bk and is rotatably supported on an axis. The rotary developing device 31 is constructed in such a manner that the desired developing assembly is transported to the position opposed to the peripheral surface of the photosensitive drum 33 as the housing is rotated, and the electrostatic latent image on the photosensitive drum is developed so that full-color development corresponding to the four colors can be carried out.

The visible image on the photosensitive drum 33, i.e., a toner image, is transferred to a transfer material P carried on a transfer drum 10 and transported to a given position. In the present example, the transfer drum 10 is rotatably supported on an axis.

A process of forming a full-color image by the use of the multi-color electrophotographic copying machine constructed as described above will be briefly described below.

The surface of the photosensitive drum 33 is uniformly charged by the operation of the primary charge assembly 34, and is then exposed to light image E corresponding to image information by the exposure means 32, so that an electrostatic latent image is formed on the photosensitive drum 33. This electrostatic latent image is rendered visible as a toner image by a toner basically composed of a resin, fed from the rotary developing device 31.

As for the transfer material P, it is fed through resist rollers 36 to the transfer drum 10 synchronizingly with the image formation, held with a gripper 15 on its leading edge, and then transported by this transfer drum 10 in the direction of an arrow shown in the drawing.

Next, in a zone in which the transfer drum 10 comes into contact with the photosensitive drum 33, the transfer drum 10 is corona-discharged from the back of a transfer material carrying member 11 in a polarity reverse to that of the toner by the operation of a transfer discharge assembly 21, so that the toner image on the photosensitive drum 33 is transferred to the transfer material P.

The transfer material P, on which the transfer steps have been repeated necessary times, is subjected to charge elimination by the operation of charge-eliminating discharge assemblies 22, 23 and 24, and concurrently separated from the transfer drum 10 by the action of a separating claw 28. The transfer material thus separated is sent by a transport belt 38 to a fixing assembly 39 and subjected to heat fixing, and then outputted to the outside of the machine.

Meanwhile, the photosensitive drum 33 is cleaned by means of a cleaning device 37 to remove the toner remaining on the surface, and thereafter made ready for the next image forming process.

The surface of the transfer material carrying member 11 of the transfer drum 10 is also cleaned by means of a cleaning device 35*a* having a cleaning blade and by the action of an auxiliary cleaning means 35*b*, and thereafter made ready for the next image forming process.

Figure 2:
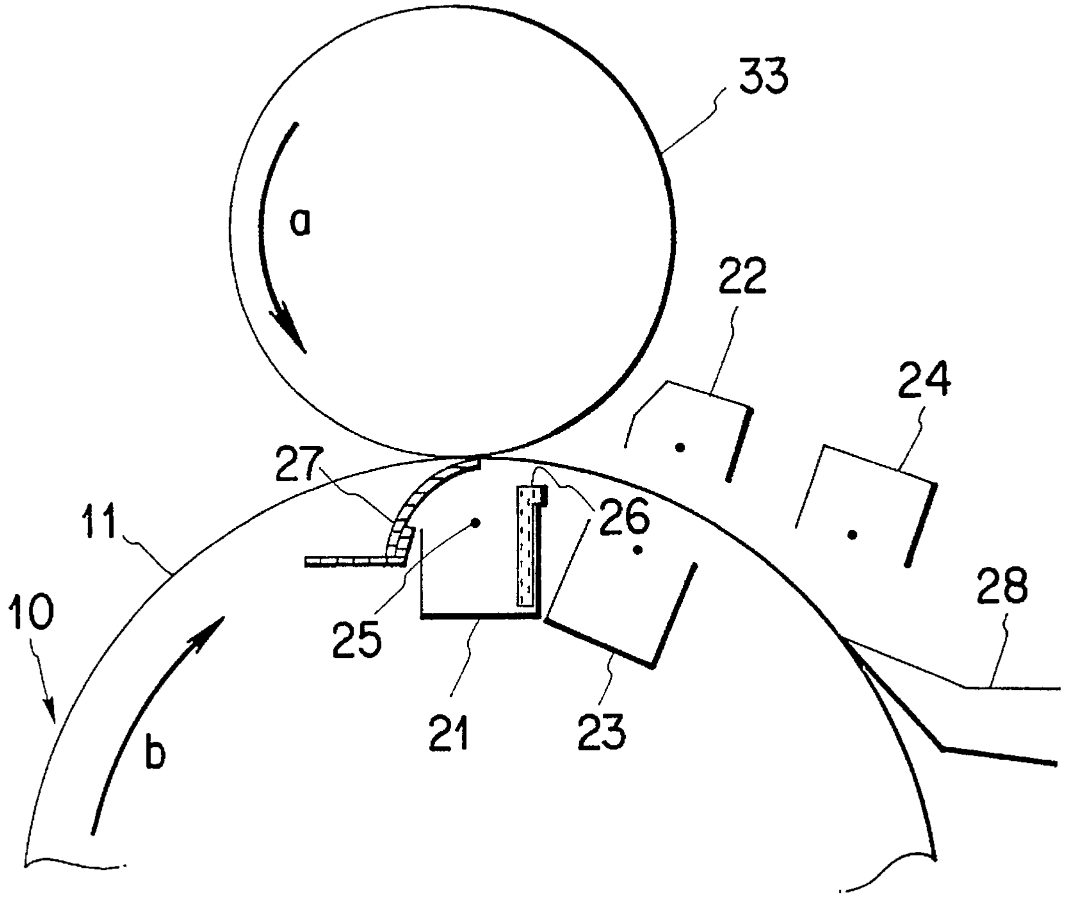
FIG. 2 is a schematic illustration of the construction of a transfer device having the transfer material carrying member of the present invention.

In the present invention, as shown in FIG. 2, an insulating member 26 as exemplified by a polycarbonate resin plate may be provided on a shield plate of the transfer corona discharge assembly 21, located downstream in the direction (the direction of an arrow b) of the rotation of the transfer drum 10, so that transfer corona toward the photosensitive drum 33 can be greater in its quantity.

In the present invention, an elastic pressure member 27 may preferably be provided which extends from the approach of the transfer material carrying member 11, downstream in the direction of its movement. This pressure member 27 is comprised of a resin as exemplified by polyethylene, polypropylene, polyester or polyethylene terephthalate, preferably having a volume resistivity of not less than $10^{10}$ Ω·cm, and particularly preferably not less than $10^{14}$ Ω·cm, and is provided through the whole area of the transfer zone.

FIG. 4 illustrates an example of an image forming apparatus making use of the transfer material carrying member of the present invention, prepared in the form of an endless belt.

The image forming apparatus shown in FIG. 4 has photosensitive drums 41*a* to 41*d*, around which primary charge assemblies 42*a* to 42*d*, exposure means 43*a* to 43*d*, developing assemblies 44*a* to 44*d*, transfer charge assemblies 45*a* to 45*d*, charge-eliminating discharge assemblies 46*a* to 46*d* and 47*a* to 47*d* and photosensitive drum cleaning devices 48*a* to 48*d* are provided, respectively. An endless belt transfer material carrying member 40 of the present invention is further provided beneath the photosensitive drums in such a manner that it passes through these units, and a transfer material carrying member cleaning device 50 having an urethane blade 49 is provided.

A transfer material P' is fed through paper feed rollers and thereafter transported by means of the endless belt transfer material carrying member 40 through transfer zones in which the respective transfer discharge assemblies 45*a* to 45*d* are provided.

The present invention will be described below in greater detail by giving Examples.

EXAMPLE 1

Using a tumbling mixer, 75 parts by weight of bisphenol-A polycarbonate resin (Upiron S-2000, trade name, available from Mitsubishi Gas Chemical Company, Ltd.; viscosity average molecular weight: 25,000; hereinafter "PC") and 25 parts by weight of titanium oxide (number average particle diameter: 0.2 μm; conductive powder W-1, available from Mitsubishi Material Co., Ltd.; hereinafter "$TiO_2$") were mixed, and the mixture was formed into pellets using a vented twin-screw extruder. The pellets thus obtained were extruded to produce a resin film with a thickness of 150 μm.

The volume resistivity of this resin film was measured by a method according to JIS-K6911. The light-transmittance (at a wavelength of 800 nm) of this resin film was also measured using a UV measuring apparatus (UV-2200, trade name, manufactured by Shimadzu Corporation).

Results obtained are shown in Table 1.

Next, using the above resin film, a transfer drum as shown in FIG. 1 was prepared. More specifically, as the transfer material carrying member 11 shown in FIG. 1, the resin film was so provided as to extend between the two aluminum cylinders 12 and 13. The transfer drum 10 was thus prepared. Both ends of the transfer material carrying member were secured to the connecting part 14 connecting the two aluminum cylinders 12 and 13.

In the present Example, the transfer drum 10 was made to have a diameter of 160 mm and set to drive at a speed of 160 mm/sec. At the same time, the speed of process, i.e., the speed of drive of the photosensitive drum 33 and so on shown in FIG. 2 was also set to be 160 mm/sec. The transfer corona discharge assembly 21 was set to have an opening width of 19 mm. A discharge wire 25 was set at 10.5 mm distant from the surface of the photosensitive drum 33, and also at 16 mm distant from the bottom of the shield plate of the transfer corona discharge assembly 21. As the pressure member 27, a polyethylene terephthalate resin film was used.

In the present Example, a latent image was formed on the photosensitive drum 33 charged to a negative polarity, using the image forming apparatus as shown in FIG. 3, and a toner image was obtained by reversal development using a toner with an average particle diameter of 8 μm. Here, the toner was comprised of a resin, a coloring material and small amounts of other additives for improving charge control properties and surface lubricity, and was chargeable to negative polarity as a result of triboelectric charging by the friction with carrier particles in the developing assembly. Thereafter, the toner image was transferred to a transfer material by means of the transfer device constructed as described above. Subsequently, the transfer material was separated from the transfer drum 10 and then subjected to image fixing using a fixing assembly.

In the present Example, the surface of the transfer material carrying member 11 of the transfer drum 10 was cleaned by means of the cleaning device 35*a* having the urethane blade, and the auxiliary cleaning means 35*b*.

In the present Example, the jam-detecting sensor set around the transfer device was provided inside the transfer drum.

A running test to reproduce images on 10,000 copy sheets was made using the multi-color electrophotographic copying machine constructed as described above. As a result, initial images were good images free from uneven transfer or the like. The same good images as initial images were obtainable also after the running.

EXAMPLE 2

$TiO_2$ was immersed in a methylene chloride solution of γ-aminopropyltriethoxysilane (KBE903, trade name, available from Shin-Etsu Chemical Co., Ltd.; hereinafter "aminosilane") (concentration: 2%), followed by removal of the solvent and then drying to give $TiO_2$ having been treated with aminosilane (hereinafter "$TiO_2$—S").

A transfer material carrying member was prepared in the same manner as in Example 1 except that the $TiO_2$ used therein was replaced with the $TiO_2$—S, and evaluation was similarly made.

Results obtained are shown in Table 1.

EXAMPLE 3

A transfer material carrying member was prepared in the same manner as in Example 1 except that 75 parts by weight of the PC used therein was replaced with 70 parts by weight of polycarbonate resin (viscosity average molecular weight: 25,000) having a repeating unit of the formula:

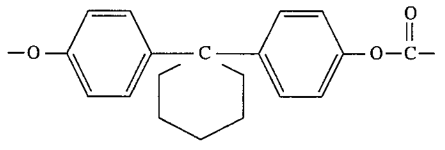

and 25 parts by weight of $TiO_2$ also used therein was replaced with 30 parts by weight of an indium oxide-tin oxide solid solution (number average particle diameter: 0.02 μm; conductive ITO, available from Mitsubishi Material Co., Ltd.; hereinafter: "ITO"). Evaluation was similarly made.

Results obtained are shown in Table 1.

EXAMPLE 4

ITO having been treated with aminosilane (hereinafter "ITO-S") was obtained in the same manner as the $TiO_2$—S in Example 2 except that $TiO_2$ was replaced with ITO.

A transfer material carrying member was prepared in the same manner as in Example 3 except that the same polycarbonate resin as used therein was used in an amount of 60 parts by weight and the ITO was replaced with the above ITO-S, and evaluation was similarly made.

Results obtained are shown in Table 1.

COMPARATIVE EXAMPLE 1

A transfer medium carrying member was prepared in the same manner as in Example 1 except that, in place of the $TiO_2$-containing polycarbonate resin used therein, only a polycarbonate resin (Upiron S-2000, available from Mitsubishi Gas Chemical Company, Inc.) was extruded into pellets. Evaluation was similarly made.

Results obtained are shown in Table 1.

COMPARATIVE EXAMPLE 2

A transfer medium carrying member was prepared in the same manner as in Example I except that the $TiO_2$ used therein was replaced with iron powder (number average particle diameter: 0.07 μm; fine Fe powder, available from Taiheiyo Kinzoku K.K.), and evaluation was similarly made.

Results obtained are shown in Table 1.

EXAMPLE 5

A polycarbonate resin film with a thickness of 150 μm was prepared in the same manner as in Example 1 except that the same polycarbonate resin as used therein was used in an amount of 70 parts by weight and 25 parts by weight of $TiO_2$ was replaced with 30 parts by weight of zinc oxide (number average particle diameter: 0.2 μm; zinc oxide conductive powder, available from Mitsui Mining and Smelting Co., Ltd.; hereinafter "ZnO").

The volume resistivity and transmittance of this sheet were evaluated in the same manner as in Example 1.

Results obtained are shown in Table 1.

This resin film was formed into an endless belt by heat sealing. Using the image forming apparatus as shown in FIG. 4 and the same toner as used in Example 1, images were reproduced to make evaluation. As a result, it was possible to obtain good images free from uneven transfer or the like.

In the present Example, the jam-detecting sensor set around the transfer device was provided inside the transfer belt.

A running test to reproduce images on 10,000 copy sheets was also made using the multi-color electrophotographic copying machine previously described. Images obtained were visually evaluated. As a result, the same good images free from uneven transfer or the like as initial images were stably obtainable also after the running.

EXAMPLE 6

ZnO having been treated with aminosilane (hereinafter "ZnO—S") was obtained in the same manner as the $TiO_2$—S in Example 2 except that $TiO_2$ used was replaced with ZnO.

A transfer medium carrying member was prepared in the same manner as in Example 5 except that the polycarbonate resin was used in an amount of 75 parts by weight and the ZnO was replaced with 25 parts by weight of ZnO—S. Evaluation was similarly made.

Results obtained are shown in Table 1.

COMPARATIVE EXAMPLE 3

A transfer medium carrying member was prepared in the same manner as in Example 6 except that the ZnO used therein was replaced with nickel powder (number average particle diameter: 0.08 μm; fine Ni powder, available from Taiheiyo Kinzoku K.K.), and evaluation was similarly made.

Results obtained are shown in Table 1.

TABLE 1

| | Volume resistivity (Ω · cm) | Transmittance (%) | Initial images | Images after running |
|---|---|---|---|---|
| Example: | | | | |
| 1 | $9.1 \times 10^{14}$ | 55 | Good | Good |
| 2 | $7.2 \times 10^{15}$ | 58 | Good | Good |
| 3 | $2.3 \times 10^{14}$ | 62 | Good | Good |
| 4 | $1.5 \times 10^{14}$ | 67 | Good | Good |
| 5 | $6.9 \times 10^{15}$ | 54 | Good | Good |
| 6 | $1.2 \times 10^{16}$ | 52 | Good | Good |
| Comparative Example: | | | | |
| 1 | $9.4 \times 10^{16}$ | 95 | * | * |
| 2 | $7.2 \times 10^{17}$ | 32 | ** | Jammed |
| 3 | $2.3 \times 10^{6}$ | 28 | ** | Jammed |

*Uneven transfer
**Blank area caused by poor transfer

As described above, the transfer medium carrying member of the present invention has superior surface electrical characteristics, mechanical strength and transparency. The image forming apparatus making use of the transfer medium carrying member enables consistently good transfer even when copies are repeatedly taken and makes it possible to obtain consistently stable, good images.

What is claimed is:

1. A transfer material carrying member for electrophotography comprising conductive metal oxide particles dispersed in a polycarbonate resin formed from a repeating unit represented by the following Formula (1):

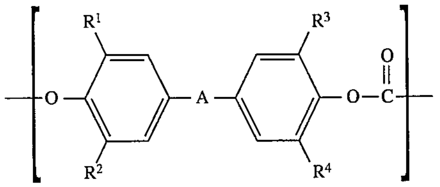

wherein A represents a straight-chain, branched or cyclic alkylidene group, an aryl-substituted alkylidene group, an arylenedialkylidene group, —O—, —S—, —CO—, —SO— or —$SO_2$—; and $R^1$, $R^2$, $R^3$ and $R^4$ each represent a hydrogen atom, a halogen atom, an alkyl group having 1 to 4 carbon atoms, or an alkenyl group, said transfer material carrying member having a volume resistivity from $1.5\times10^{14}$ Ω·cm to $1.2\times10^{16}$ Ω·cm.

2. A transfer material carrying member according to claim 1, wherein said polycarbonate resin is a homopolymer or a copolymer having two or more repeating units represented by Formula (1).

3. A transfer material carrying member according to claim 2, wherein said polycarbonate resin is a homopolymer.

4. A transfer material carrying member according to claim 2, wherein said polycarbonate resin is a copolymer.

5. A transfer material carrying member according to claim 1, wherein the monomer which forms the repeating unit is a compound selected from the group consisting of 2,2-bis(4-hydroxyphenyl)propane, 1,1-bis(4-hydroxyphenyl)propane and 1,1-bis(4-hydroxyphenyl)cyclohexane.

6. A transfer material carrying member according to claim 1, wherein said metal oxide has a number average particle diameter of 1 μm or less.

7. A transfer material carrying member according to claim 6, wherein said number average particle diameter is 0.3 μm or less.

8. A transfer material carrying member according to claim 1, wherein said metal oxide has a volume resistivity of not higher than 100 Ω·cm.

9. A transfer material carrying member according to claim 8, wherein said volume resistivity is not higher than 70 Ω·cm.

10. A transfer material carrying member according to claim 1, wherein said metal oxide is contained in an amount of from 1 part by weight to 300 parts by weight based on 100 parts by weight of the polycarbonate resin.

11. A transfer material carrying member according to claim 10, wherein said amount is from 3 parts by weight to 100 parts by weight based on 100 parts by weight of the polycarbonate resin.

12. A transfer material carrying member according to claim 1, wherein said transfer material carrying member has a specific dielectric constant of not less than 2.5.

13. A transfer material carrying member according to claim 1, wherein said transfer material carrying member is in the form of a sheet or an endless belt.

14. A transfer material carrying member according to claim 13, wherein said transfer material carrying member has a thickness of from 50 μm to 300 μm.

15. A transfer material carrying member according to claim 14, wherein said thickness is from 70 μm to 200 μm.

16. An electrophotographic image forming apparatus having an image bearing member and a transfer material carrying member;

said transfer material carrying member comprising conductive metal oxide particles dispersed in a polycarbonate resin formed from a repeating unit represented by the following Formula (1):

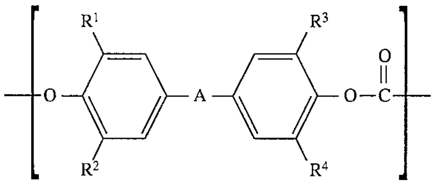

wherein A represents a straight-chain, branched or cyclic alkylidene group, an aryl-substituted alkylidene group, an arylenedialkylidene group, —O—, —S—, —CO—, —SO— or —$SO_2$—; and $R^1$, $R^2$, $R^3$ and $R^4$ each represent a hydrogen atom, a halogen atom, an alkyl group having 1 to 4 carbon atoms, or an alkenyl group, said transfer material carrying member having a volume resistivity from $1.5\times10^{14}$ Ω·cm to $1.2\times10^{16}$ Ω·cm.

17. An image forming apparatus according to claim 16, wherein said polycarbonate resin is a homopolymer or a copolymer having two or more repeating units represented by Formula (1).

18. An image forming apparatus according to claim 17, wherein said polycarbonate resin is a homopolymer.

19. An image forming apparatus according to claim 18, wherein said polycarbonate resin is a copolymer.

20. An image forming apparatus according to claim 16, wherein the monomer which forms the repeating unit is a compound selected from the group consisting of 2,2-bis(4-hydroxyphenyl)propane, 1,1-bis(4-hydroxyphenyl)propane and 1,1-bis(4-hydroxyphenyl)cyclohexane.

21. An image forming apparatus according to claim 16, wherein said metal oxide has a number average particle diameter of 1 μm or less.

22. An image forming apparatus according to claim 21, wherein said number average particle diameter is 0.3 μm or less.

23. An image forming apparatus according to claim 16, wherein said metal oxide has a volume resistivity of not higher than 100 Ω·cm.

24. An image forming apparatus according to claim 23, wherein said volume resistivity is not higher than 70 Ω·cm.

25. An image forming apparatus according to claim 16, wherein said metal oxide is contained in an amount of from 1 part by weight to 300 parts by weight based on 100 parts by weight of the polycarbonate resin.

26. An image forming apparatus according to claim 25, wherein said amount is from 3 parts by weight to 100 parts by weight based on 100 parts by weight of the polycarbonate resin.

27. An image forming apparatus according to claim 16, wherein said transfer material carrying member has a specific dielectric constant of not less than 2.5.

28. An image forming apparatus according to claim 16, wherein said transfer material carrying member is in the form of a sheet or an endless belt.

29. An image forming apparatus according to claim 28, wherein said transfer material carrying member has a thickness of from 50 μm to 300 μm.

30. An image forming apparatus according to claim 29, wherein said thickness is from 70 μm to 200 μm.

* * * * *